United States Patent

Streck

[15] 3,635,652
[45] Jan. 18, 1972

[54] PROCESS FOR DYEING POLYURETHANE FOAM IN NONAQUEOUS DYE BATH

[72] Inventor: Clemens Streck, Loudonville, N.Y.
[73] Assignee: GAF Corporation, New York, N.Y.
[22] Filed: July 5, 1968
[21] Appl. No.: 742,523

[52] U.S. Cl. ...........................................8/4, 260/2.5 AK
[51] Int. Cl. ...........................................D06p 3/24
[58] Field of Search.................................8/4, 178 E

[56] References Cited

UNITED STATES PATENTS

| | | | |
|---|---|---|---|
| 2,384,001 | 9/1945 | Wesson | 8/173 X |
| 3,120,423 | 2/1964 | Herschler et al. | 8/172 X |
| 3,337,289 | 8/1967 | Manwaring | 8/4 |
| 3,432,251 | 3/1969 | Fisher | 8/4 |

OTHER PUBLICATIONS

Colour Index 2nd Ed. 1956, Vol. 2 pp. 2815 and 2816, Publ. AATCC, Lowell, Mass.

Du Pont Dyes & Chem. Tech. Bulletin, Vol. 18 (2) 1962, pp. 89–93.

*Primary Examiner*—George F. Lesmes
*Assistant Examiner*—T. J. Herbert, Jr.
*Attorney*—George L. Tone, Walter C. Kehm and Samson B. Leavitt

[57] ABSTRACT

A composition of matter comprising polyurethane foams and articles foamed therefrom, having applied thereto an essentially water-insoluble dyestuff of the class known as spirit or solvent-soluble dyestuffs; particularly those dyestuffs of this class which are formed by the reaction of water-soluble dyes which contain water-solubilizing sulfonic or carboxylic acid groups with water-insoluble amines which are free from such solubilizing groups. In addition to the amine-salt-type of spirit or solvent-soluble dyestuffs, the metallized O,O'-dihydroxy azo-type of spirit or solvent soluble-dyestuffs may be used. The invention is also concerned with a method for the production of dyed polyurethane foams which comprises applying to the polyurethane foam or article a solution of a water-insoluble, spirit or solvent-soluble dyestuff in a volatile organic solvent.

6 Claims, No Drawings

PROCESS FOR DYEING POLYURETHANE FOAM IN NONAQUEOUS DYE BATH

BACKGROUND OF THE INVENTION

The class of polymers known as polyurethanes are well known in the art and are commonly produced by reacting diisocyanates, such as toluene diisocyanate, with glycols, polyols, hydroxyl-rich polyesters and various polyethers. In the production of these polymers, several methods are available to produce foams by taking advantage of various aspects of the reaction. For example, if high acid values are present in the compound to be reacted with the isocyanate, a gas-forming reaction occurs which results in the production of a foam. It is also known to produce foams based on castor oil formulations as outlined in U.S. Pat. No. 2,787,601 or by the so-called "one-shot" method wherein a glycol, a polyacid and a diisocyanate are reacted in the presence of an activator mixture to effect foaming.

Flexible foams formed by the methods outlined above are well known to be useful for filling and insulation purposes but in recent years have become useful in many other areas where color is an important characteristic. Thus polyurethane foams are now in common use in the production of clothing, cleaning brushes and sponges, cushions for weather stripping, lamination to fabrics to produce various materials such as synthetic leathers and the like. It has, therefore, become important to provide means for coloring the foams to enhance their appearance.

Various procedures have been attempted heretofore in an effort to devise suitable methods for dyeing polyurethanes in a satisfactory manner. One method which has been employed involves incorporating a pigment dye into the reaction mass prior to the production of the foam. However, this method has the disadvantage that the final coloration cannot be carefully controlled as it is dependent on reaction conditions. Moreover, it is difficult to obtain a uniform dispersion of the pigment in the reaction mass so as to obtain a uniformly colored product.

It has also been suggested to dye the polyurethane foams with direct dyes such as, for example, by the method described in U.S. Pat. No. 3,197,268. However, this method has not been entirely satisfactory because of the problem of obtaining suitable color fastness.

It is, therefore, apparent that a distinct need remains in the art for a suitable method of dyeing polyurethane foams and articles produced therefrom.

SUMMARY OF THE INVENTION

It is accordingly one object of the present invention to provide compositions of matter comprising dyed polyurethane foams, and articles formed therefrom, and processes for dyeing the same, which overcome or otherwise mitigate the disadvantages of prior art methods of dyeing.

It is a further object of the invention to provide compositions of matter comprising dyed polyurethane foams, and articles produced therefrom, wherein the polyurethane foams are dyed with essentially water-insoluble, spirit or solvent soluble dyestuffs dissolved in an organic solvent, the dyed products resulting therefrom being characterized by good fastness properties particularly in the bright colors.

A still further object of the present invention is to provide methods for the dyeing of polyurethane foams, whereby the final color of the foam is effectively controlled and which serves to mitigate or otherwise overcome the several problems faced by prior art processes.

Other objects and advantages of the present invention will become apparent as the description thereof proceeds.

In satisfaction of the foregoing objects and advantages, there is provided by this invention compositions of matter comprising polyurethane foams, and articles formed therefrom, having applied thereto essentially water-insoluble dyestuffs. Such spirit or solvent-soluble dyestuffs comprise (I) dyestuffs formed by the reaction of water-soluble dyes which contain water-solubilizing sulfonic or carboxylic acid groups, with amines which are free from such solubilizing groups, and (II) spirit and solvent-soluble dyestuffs of the metallized, 0,0'-dihydroxy-azo type. The novel dyed compositions of this invention are characterized by good color fastness and color uniformity.

There is also provided by the present invention a process for the production of dyed polyurethanes which comprises dissolving a water-insoluble, spirit or solvent-soluble dyestuff of the above types (I) or (II) in an organic solvent, and applying the resulting product to the polyurethane foam.

DESCRIPTION OF THE PREFERRED EMBODIMENTS

It has now been discovered that certain essentially water-insoluble, spirit or solvent-soluble dyestuffs may be employed to provide colored articles of the class of materials commonly referred to as polyurethane foams by dyeing, padding or printing the foams with organic solvent solutions of the dyestuffs to be described hereinafter. The resultant products have been found to be characterized by good fastness properties and uniformity of color. The process of this invention has been found extremely suitable where dyeing with bright colors is desired. Moreover, it has been found that the present invention provides a procedure wherein the final color of the foam may be easily and carefully controlled.

The polyurethane foams to which the invention is applicable are specifically set forth hereinabove. In general, it may be said that the products commonly referred to as "polyurethane foams" and the various articles produced therefrom, are susceptible to excellent dyeing employing the dyes and processes of this invention.

The dyes employed in the present invention in one embodiment generally comprise (I) water-insoluble, spirit-soluble amine salts of acid and direct dyes. These water-insoluble salts are generally spirit-soluble and are preferably produced by reacting a water-soluble dye molecule containing at least one sulfonic or carboxylic acid group with an equivalent amount of a water-insoluble amine. In a further embodiment, there may also be employed (II) metallized 0,0'-dihydroxy-azo-type spirit or solvent soluble dyes.

The amine-salt dyes may also be formed from metallized salts of water-soluble dyes which contain at least one sulfonic acid or carboxylic acid group which may be converted into the spirit-soluble salts. It is contemplated that any colored dye molecule which contains at least one acidic group of the class indicated may be employed to produce the water-soluble amine salt.

Among the acidic and direct dye molecules which have been found to be operable to react with the amine to form the amine salts are those of the following specific formulas, and Color Index name and number identification:

I. 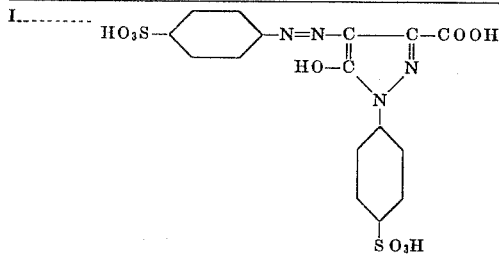 Acid Yellow 23; C.I. 19140.

II. 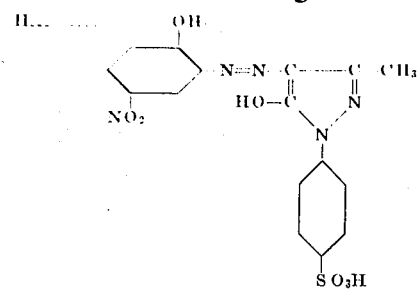 Solvent Orange 20.
III. 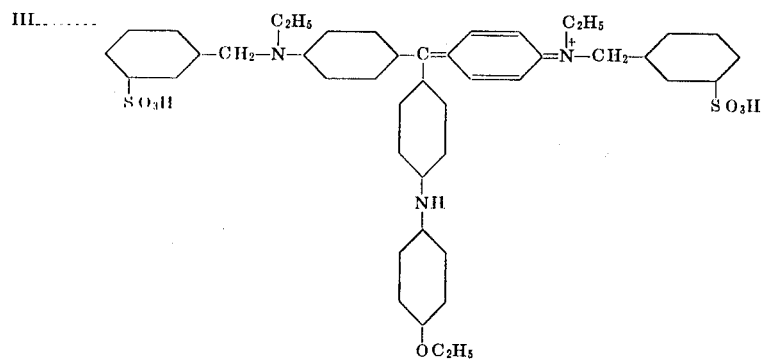 Acid Blue 83; C.I. 42660.
IV. 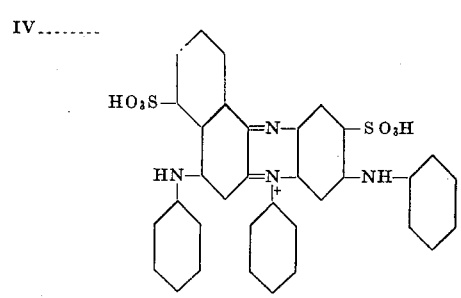 Acid Blue 59; C.I. 50315.
V. Sulfonated copper phthalocyanine ............ Direct Blue 86; C.I. 74180.
VI. 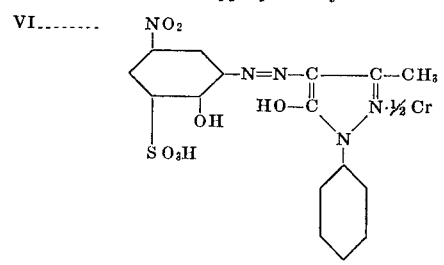 Acid Orange 72; C.I. 18740.
VII. 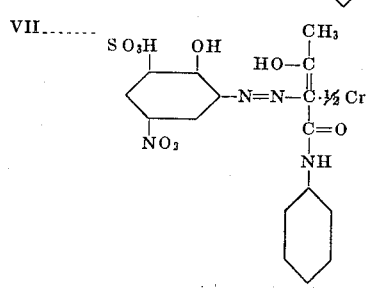 Acid Yellow 99; C.I. 13900.
VIII. 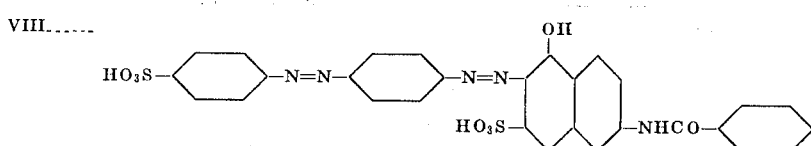 Direct Red 81; C.I. 28160.
IX. 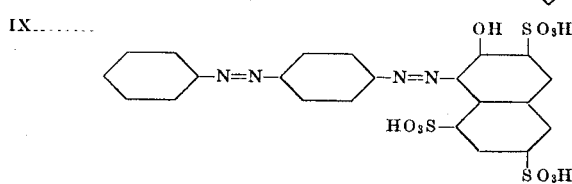 Solvent Red 31; C.I. 27306.

| | | |
|---|---|---|
| X | 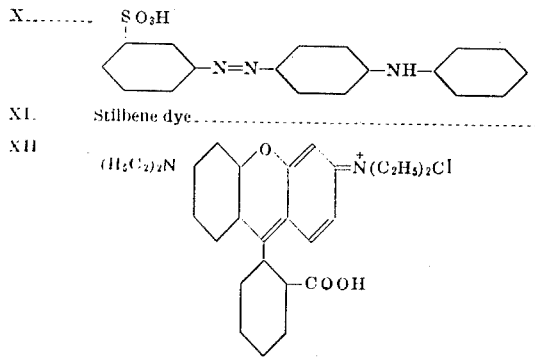 | Acid Yellow 36; C.I. 13065. |
| XI | Stilbene dye | Direct Yellow 11; C.I. 4000. |
| XII | | Solvent Red 49; C.I. 45170B. |

In addition, any dyes of the anthraquinone, triphenylmethane and phthalein type are also considered operable in this aspect of the invention so long as they contain at least one acid group of the sulfonic or carboxylic acid type.

Each of the several dye molecules mentioned are well known in the art and particularly those indicated by the Color Index reference numbers listed hereinabove.

This listing of acid dye molecules is considered to be merely illustrative of the type of acid or direct dyes which may be employed in the invention and, therefore, is not to be considered as encompassing all operative dyes as it is contemplated that any acid or direct dyes containing sulfonic or carboxylic acid groups are operative in forming the dyestuff salts of the invention.

To form the amine-salt dyestuffs of the invention, these acid group-containing dyes are reacted with an equivalent amount of a basic grouping comprising a water-insoluble amine to produce a water-insoluble dyestuff salt. It is contemplated that any water-insoluble amines may be employed in forming the dyestuffs of the invention. It has been found, however, that those described hereinafter are particularly suitable.

The salts of dyestuffs having acid groups formed by their reaction with organic bases are well known in the art as spirit-soluble dyes and are used for spirit printing inks, for ball point pen inks, for staining wood and leather, for coloring of lacquers and melt or solution coloring of certain plastics. See for example Lubs, "The Chemistry of Synthetic Dyes and Pigments," ACS Monograph No. 127, Reinhold Publishing Corporation, N.Y. 1955, page 177.

It has now been discovered that these drestuff-salts are valuable for the dyeing of polyurethane foams when dissolved in a suitable organic solvent to form a dyebath. A number of such dyestuffs are commercially available under such trade names as AZOSOL, (General Aniline & Film Corporation); LUXOL, (E. I. du Pont); METHASOL, (Imperial Chemical Industries, Ltd.); ORASOL, (Ciba, Ltd.); and ZAPON, (Badische Anilin Sodafabrik and Hoechst).

It is particularly preferred to employ the salts of dyestuffs containing a sulfonic or carboxylic acid group reacted with cycloaliphatic amines, such as monocyclohexyl amine and dicyclohexyl amine, as described in U.S. Pat. Nos. 1,800,299 and 1,800,300 and 2,070,275 or with the disubstituted guanidines, particularly diaryl guanidines, exemplified by diphenylguanidine, described in U.S. Pat. No. 1,674,128 and alkylamines of the formula:

$$R-N-R$$
$$\phantom{R-N-}|$$
$$\phantom{R-N-}R''$$

wherein R and R' are alkyl groups of five to six carbon atoms and R'' is selected from the group consisting of hydrogen and alkyl radicals of five to six carbon atoms, described in U.S. Pat. No. 2,095,077. Other amines which may be mentioned include long chain amines of the formula:

wherein R is a long carbon chain alkyl radical and $R_1$ and $R_2$ are alkyl radicals of one to two carbon atoms. Illustrative of this class of amines is diethyloctadecylamine, described in U.S. Pat. No. 1,836,047. Also found to be operative are the tertiary alkyl amines of the following formula:

wherein R is an alkyl radical of about nine to 15 carbon atoms and $R_1$ and $R_2$ are alkyl radicals of not more than about four carbon atoms. Exemplary of this class is n-dibutyllaurylamine, as described in U.S. Pat. No. 1,836,048.

It is also known to use certain cationic dyestuffs, having secondary amino substituents, as the amine for forming the water insoluble, spirit soluble amine-salt-type dyestuff useful in this invention. As examples of such cationic dyestuffs, whose salts with acid dyestuffs such as those named above may be used there may be mentioned the following:

| Cationic Dyestuff | Color Index Identification |
|---|---|
| Rhodamine 6G | C.I. 45160 |
| Rhodamine B | C.I. 45170 |
| Rhoduline Blue 6G | C.I. 42025 |
| Rhoduline Blue 5B | C.I. 42140 |
| Methylene Blue BB | C.I. 52015 |

Other amine bases which may be mentioned include the imidazoles, e.g., 2-ortho-toluidobenzimidazole, described in U.S. Pat. No. 1,860,036, as well as acylated alkylamines, such as oleoyl ethanolamine, (U.S. Pat. No. 2,022,678); long chain alkyl amines including those derived from palm kernel oil and described in U.S. Pat. No. 2,187,816 and isoalkylamines, such as those illustrated in U.S. Pat. No. 2,315,870. In addition there may also be mentioned the alkylalkylolamines, such as N-di-n-butyl ethanol amine, described in U.S. Pat. No. 2,490,703. It is also contemplated that mixtures of these amines may be employed. For example, a mixture of diphenylguanidine and ditolylguanidine forms an especially preferred amine base reactant.

In addition to this listing of specific amine bases which are useful in forming the dyes of the invention, it is contemplated that other amines not listed are also operable and thus fall within the scope of the invention as other water-insoluble amine bases will become obvious to those skilled in the art.

The acid or direct dye molecules described hereinabove are reacted with the amine bases in equivalent amounts to form the water-insoluble, spirit-soluble dyestuffs employed in the present invention.

In a preferred procedure for carrying out the reaction, the acid dye molecule is initially dissolved in an aqueous bath and the amine base added thereto. The amine per se may be added to the bath or it may be added in dispersed form or in the form of an acid salt. After addition of the amine, the amine salt of the acidic or direct dye precipitates as salt formation occurs.

After completion of the reaction, the essentially water-insoluble amine-salt dyestuff is filtered, washed with water and dried.

There may also be employed in the present invention dyestuffs of the metallized azo type which are spirit or solvent soluble but which are not amine salts. These dyestuffs may be generally described as metalliferous azo dyes which contain one atom of metal bound in complex union to two molecules of monoazo dyes. The monoazo dyestuffs of this type are in general the pyrazolone-type azo dyestuffs which may be represented by the following general formula:

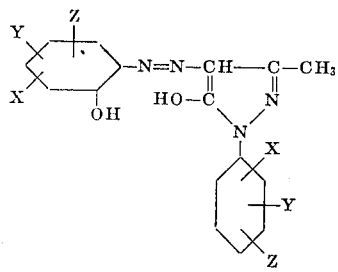

wherein one X is hydrogen and the other X is nitro and Y and Z each represent hydrogen or a nonionic, nonchromophoric substituent such as chloro, bromo, lower alkyl, alkoxy, nitrilo, trifluoromethyl and the like. Typical metals which may be employed to form the metallized dyes include cobalt, nickel, copper, chromium and the like.

Dyestuffs of this general type which may be employed include the following specific listing wherein the particular diazo base, coupler, metal and color of the resulting dye are set forth.

| Diazo Base | Coupler | Metal | Color |
|---|---|---|---|
| 2-Amino-4-nitrophenol | Resorcinol | Co | Red |
| 2-Amino-4-chlorophenol | Resorcinol | Ni | Brownish orange |
| 2-Amino-4-chloro-5-nitrophenol | Acetoacetanilide | Cu | Bluish black |
| 2-Amino-4-chlorophenol | 4-tert.-butylphenol | Cu | Brown |
| 2-Amino-4-nitrophenol | 3,4-Xylenol | Cr | Reddish brown |
| Anthranilic acid | 3-Hydroxy-2-naphthanilide | Cu | Maroon |
| 2-Amino-5-chloro-benzoic acid | 2-Hydroxy-3-naphth-p-chloroanilide | Cu | Maroon |
| 2,5-Dimethoxyaniline | 2-Naphthol | Cr | Blue |
| Dianisidine | 3-Hydroxy-2-naphthanilide | Cr | Greenish Blue |
| Dianisidine | 3-Hydroxy-2,5-dimethoxy-aniline | Cu | Blue |
| 2-Amino-4-chlorophenol | 5-Hydroxynaphthalenesulfonamide | Cu | Bluish rubine |
| 2-Amino-4-chloro-5nitrophenol | 4-Hydroxy-N,N'-dimethyl-2,6-naphthalenedisulfonamide | Cr | Greenish blue |
| 3-Amino-4-hydroxy-benzenesulfonamide | 4-Hydroxy-N-methyl-naphthalene-sulfonamide | Cr | Bluish red |
| 2-Amino-4-methyl-sulfonylphenol | B-Naphthylamine | Co | Red orange |
| 4-Amino-3-hydroxy-benzenesulfonamide | 8-Acetylamino-1-naphthol | Co | Reddish blue |
| 2-Amino-4-chloro-5-nitrophenol | 1-Acetylamino-8-hydroxy-N,N',N'-tetramethyl-2,6-naphthalenedi-sulfonamide | Cr | Greenish blue |
| 2-Amino-4-nitro-phenol | 3-Methyl-5-pyrazol-1-yl-benzene-3-sulfonamide | Co | Brownish yellow |
| 2-Amino-5-sulfamyl-benzoic acid | 1-(2,5-Dichloro-phenyl)-3-methyl-5-pyrazolone | Cr | Reddish yellow |
| 3-Amino-4-hydroxy-N,N'-dimehtyl benzenesulfonamide | 3-Methyl-1-phenyl-5-pyrazolone | Cr | Orange |

In accordance with a preferred embodiment in conducting the process of the invention, the water-insoluble, spirit-soluble dye, obtained as set forth hereinabove, is applied to the polyurethane foam by use of a solvent system of the dyestuff. In a preferred aspect, about 0.1 to 5.0 percent of the dyestuff is dissolved in a suitable solvent for application to the foam. Of the solvents considered suitable for the invention, organic solvents having a relatively low molecular weight are especially preferred. Representative of these preferred solvents are the following: methyl alcohol, ethyl alcohol, n-propanol; isopropanol, butanol, ethylene glycol, methoxyethanol, 2-ethoxy-ethanol, butoxyethanol, acetone, ethers and the like. It is also contemplated that other solvents such as carbon tetrachloride, chloroform, ethylene dichloride, benzene, toluene, and the like, may be employed in the process of the invention. The suitable solvents may be broadly described as alkanols, glycols, alkoxyalkanols, ketones, ethers, hydrocarbons and halogenated hydrocarbons.

After formation of the dyestuff solution, a preferred method of carrying out the dyeing process is to pad the polyurethane foam with the dye solution, squeeze out the excess dye and dry the foam.

The following working examples are illustrative of the invention and are not intended to be limitative thereto.

Example 1

0.5 Grams of the dicyclohexylamine salt of Dyestuff II (listed above) were dissolved in 100 grams of ethyl alcohol to form a dye solution. Then 5 grams of commercially available polyurethane foam was padded through this solution at room temperature and dried. The resulting uniformly dyed foam was a bright orange shade which exhibited good fastness to washing and dry cleaning.

EXAMPLE 2

The process of example 1 was repeated except that 0.5 grams of the dicyclohexylamine salt of Dyestuff II (listed above) were dissolved in 100 grams of 2-ethoxyethanol. The resulting dyed polyurethane foams was a bright orange shade which exhibited good fastness to washing and dry cleaning and showed uniform color.

EXAMPLE 3

0.25 Grams of the ditolyl guanidine salt of Dyestuff I (listed above) were dissolved in 100 grams of 2-ethoxyethanol to form a dye solution. Then 5 grams of polyurethane foam was padded through the solution at room temperature and dried. The resulting dyed polyurethane foam was a bright yellow shade which had good fastness to washing and dry cleaning and exhibited uniform color.

EXAMPLE 4

0.5 Grams of the salt formed by a 50:50 mixture of Rhodamine 6G (C.I. 45160) and Rhodamine B (C.I. 45170) with Dyestuff VII (listed above) were dissolved in 100 grams 2-ethoxyethanol to form a dye solution. Thereafter, 5 grams of polyurethane foam was padded through this solution at room temperature and dried. The resulting dyed foam was a bright red shade and exhibited very good fastness to washing and dry cleaning.

EXAMPLES 5 to 10

In the following examples, 0.5 grams of the dye indicated was dissolved in 100 grams of 2-ethoxyethanol to form the dye solution. Thereafter, 5 grams of the polyurethane foam was padded through the solution as in example 1 and dried to yield bright uniform colorations having good fastness properties. These examples are as follows:

| Example | Dye C.I. Name | Color |
|---|---|---|
| 5 | Solvent Blue 9 | Blue |
| 6 | Solvent Green 2 | Green |
| 7 | Solvent Yellow 44 | Yellow |
| 8 | Solvent Yellow 13 | Yellow |
| 9 | Solvent Red 31 | Scarlet |
| 10 | Solvent Blue 24 | Blue |

EXAMPLES 11 to 19

In the following examples 0.5 grams of the dye indicated was dissolved in 100 grams of 2-ethoxy ethanol to form the dye solution. Thereafter, 5 grams of polyurethane foam was padded through the solution as in example I and dried to yield bright uniform coloration having good fastness properties. These examples are as follows:

| Dye | Amine | Color |
|---|---|---|
| 11. Cu phthalocyaninesulfonic acid C.I. 74180 | Amine mixture from fatty acids of palm kernel oil | Blue green |
| 12. Cu phthalocyaninesulfonic acid C.I. 74180 | Rhoduline Blue 6G (C.I. 42025) | Blue green |
| 13. Cu phthalocyaninesulfonic acid C.I. 74180 | Rhoduline Blue 5B (C.I. 42140) | Blue green |
| 14. Cu phthalocyaninesulfonic C.I. 74180 | Methylene Blue BB (C.I. 52015) | Blue green |
| 15. 2-Nitro-5-chloroaniline-4-sulfonic acid | Cyclohexylamine | Greenish yellow |
| 16. 2,4-Dinitrodiphenylamine-3'-sulfonic acid | Cyclohexylamine | Yellow |
| 17. 1-Amino-4-(phenylamino)-2-anthraquinonesulfonic acid | Dicyclohexylamine | Blue green |

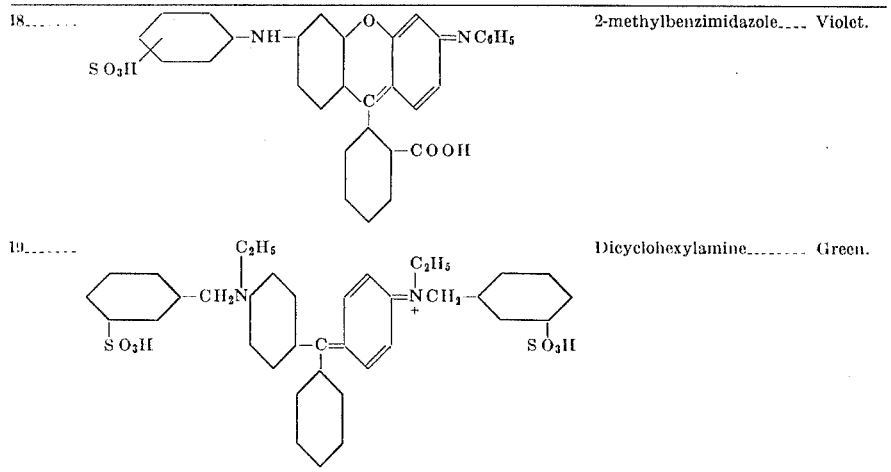

| | | |
|---|---|---|
| 18. | 2-methylbenzimidazole | Violet. |
| 19. | Dicyclohexylamine | Green. |

EXAMPLES 20 to 26

The following examples were conducted in the same manner as examples 11 to 19 except the azo dyes were obtained by coupling the diazo of the amine indicated with its coupler indicated in the form of its salt with the amine indicated. In each instance a bright uniform coloration of the shade indicated in these examples was obtained. These examples are as follows:

| | Diazo coupler | Amine | Color |
|---|---|---|---|
| 20 | 2-Amino-4-nitrophenol → 4-(3-methyl-5-oxo-2-pyrazolin-1-yl benzenesulfonic acid. | Dicyclohexylamine. | Orange. |
| 21 | Anthranilic acid → 4-(3-methyl-5-oxo-2-pyrazolin-1-yl) benzenesulfonic acid. | do | Yellow. |
| 22 | Orthanilic acid → 1-phenyl-5-oxo-2-pyrazolin-3-ylcarboxylic acid. | N-di-n-butylethanol-amine. | Do. |
| 23 | Sulfanilic acid → 7-benzoylamido-4-hydroxy-2-naphthalenesulfonic acid. | Mixture of diphenyl- and ditolylguanidine. | Red. |
| 24 | Aniline → salicyclic acid | Quinoline | Reddish yellow. |
| 25 | p-Nitroanilin → salicyclic acid. | 2-o-toluidobenzimidazole. | Do. |
| 26 | Sulfanilic acid → aniline → 7-benzoylamido-4-hydroxy-2-naphthalenesulfonic acid. | N-di-n-butylethanol amine. | Red. |

It is obvious that numerous changes and modifications may be made in the invention without departing from the spirit thereof. Therefore it is to be understood that all such changes and modifications are considered to be included within the scope of the invention and the invention is not to be considered as limited except as set forth in the appended claims.

What is claimed is:

1. The process for dyeing polyurethane foam which comprises contacting such foam with a nonaqueous dyestuff solution of
   a. a water-insoluble, spirit or solvent-soluble amine-salt dyestuff formed by reaction of a dye molecule containing at least one carboxylic or sulfonic acid grouping with a water-insoluble amine, or
   b. a water-insoluble, spirit or solvent-soluble metallized, 0,0'-dihydroxy azo dyestuff dissolved in a low molecular weight anhydrous organic solvent therefor selected from the group consisting of alkanols, glycols, alkoxyalkanols, ketones, ethers, hydrocarbons and halogenated hydrocarbons and drying the dyed polyurethane foam.

2. The process according to claim 1 wherein the dyestuff is selected from group (a).

3. A process according to claim 1 wherein the dyestuff is present in the organic solvent in an amount of about 0.1 to 5.0 percent per 100 parts of organic solvent.

4. A process according to claim 1 wherein the dyestuff is selected from group (b).

5. A process according to claim 1 wherein the nonaqueous dyestuff solution is padded on the polyurethane foam.

6. A process according to claim 1 wherein the organic solvent is 2-ethoxyethanol.